United States Patent
Madni et al.

(10) Patent No.: US 6,304,076 B1
(45) Date of Patent: Oct. 16, 2001

(54) ANGULAR POSITION SENSOR WITH INDUCTIVE ATTENUATING COUPLER

(75) Inventors: Asad M. Madni, Los Angeles; Jim B. Vuong, Northridge, both of CA (US)

(73) Assignee: BEI Sensors & Systems Company, Inc., Slymar, CA (US)

( * ) Notice: Subject to any disclaimer, the term of this patent is extended or adjusted under 35 U.S.C. 154(b) by 0 days.

(21) Appl. No.: 09/390,885

(22) Filed: Sep. 7, 1999

(51) Int. Cl.[7] .................................................. G01B 7/14
(52) U.S. Cl. .............................. 324/207.17; 324/207.25; 318/660
(58) Field of Search .................. 324/207.17, 207.25, 324/207.15, 207.12; 336/120; 318/652, 653, 662, 660, 661; 73/290 R, 317; 702/189; 310/68 B

(56) References Cited

U.S. PATENT DOCUMENTS

| | | |
|---|---|---|
| 4,737,698 * | 4/1988 | McMullin et al. ................ 318/653 |
| 4,986,124 | 1/1991 | Byrne et al. . |
| 5,239,288 * | 8/1993 | Tsals ................................... 336/120 |
| 5,406,155 * | 4/1995 | Person .................................. 310/68 B |
| 5,767,670 * | 6/1998 | Maher et al. ..................... 324/207.12 |

* cited by examiner

Primary Examiner—Safet Metjahic
Assistant Examiner—Subhash Zaveri
(74) Attorney, Agent, or Firm—Coudert Brothers

(57) ABSTRACT

A non-contact angular position sensor has juxtaposed transmit and receive disks with a coupler disk, carrying a conductive attenuating pattern interposed therebetween. A pattern of inductive coils, which completely encircle both the transmit and receive disks have their inductive coupling individually attenuated in accordance with the angular position of the symmetrical conductive pattern on the intermediate coupling disk. The transmit disk is driven by a signal source which when received and demodulated by the receive coils and summed together provides a unique sinusoidal signal whose phase is indicative of the angular position of the intermediate coupler. The conductive pattern on the coupler is designed to provide a linear output.

10 Claims, 8 Drawing Sheets

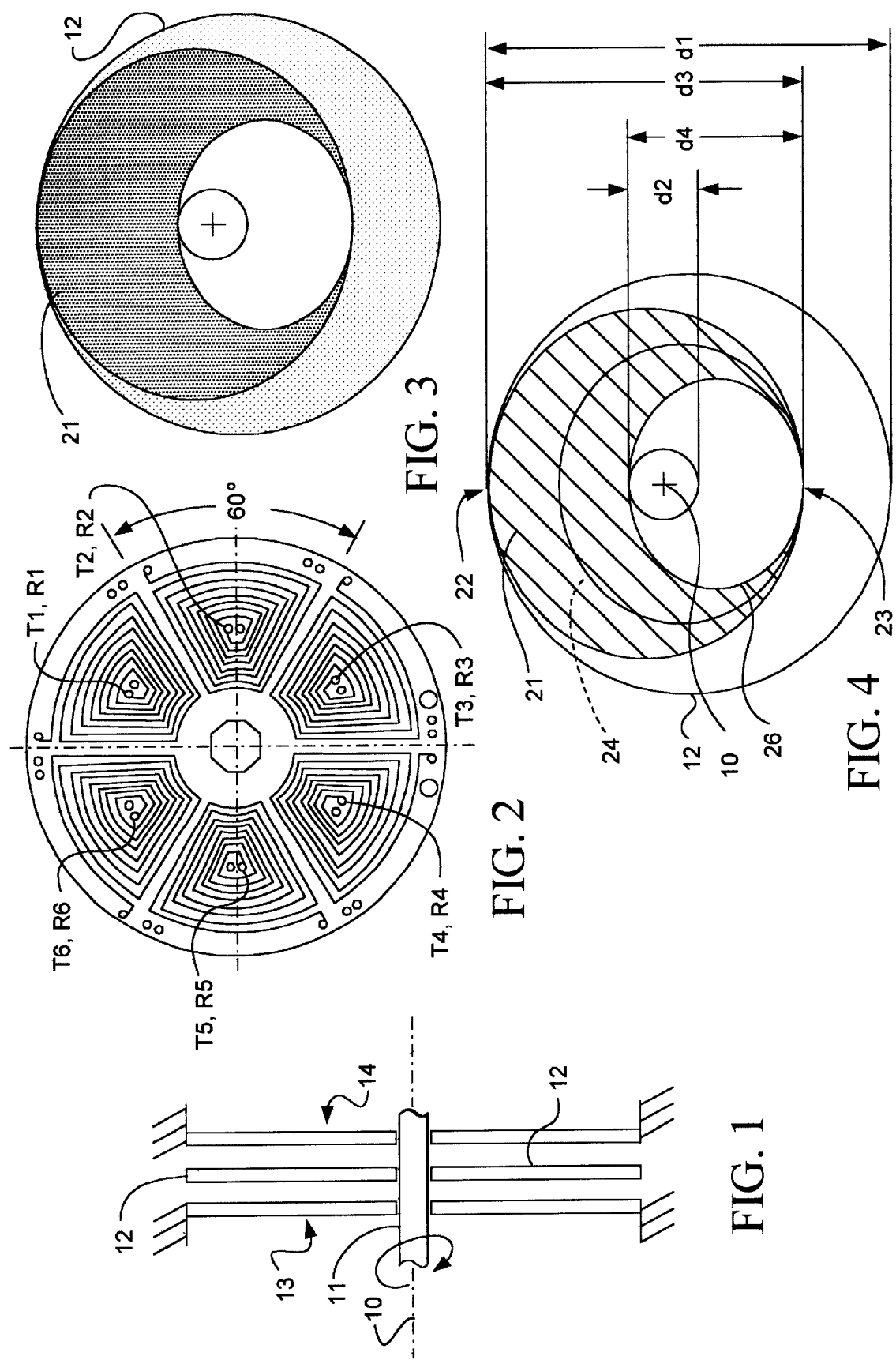

S

R1

PWM

S

R2

PWM

S

R3

PWM

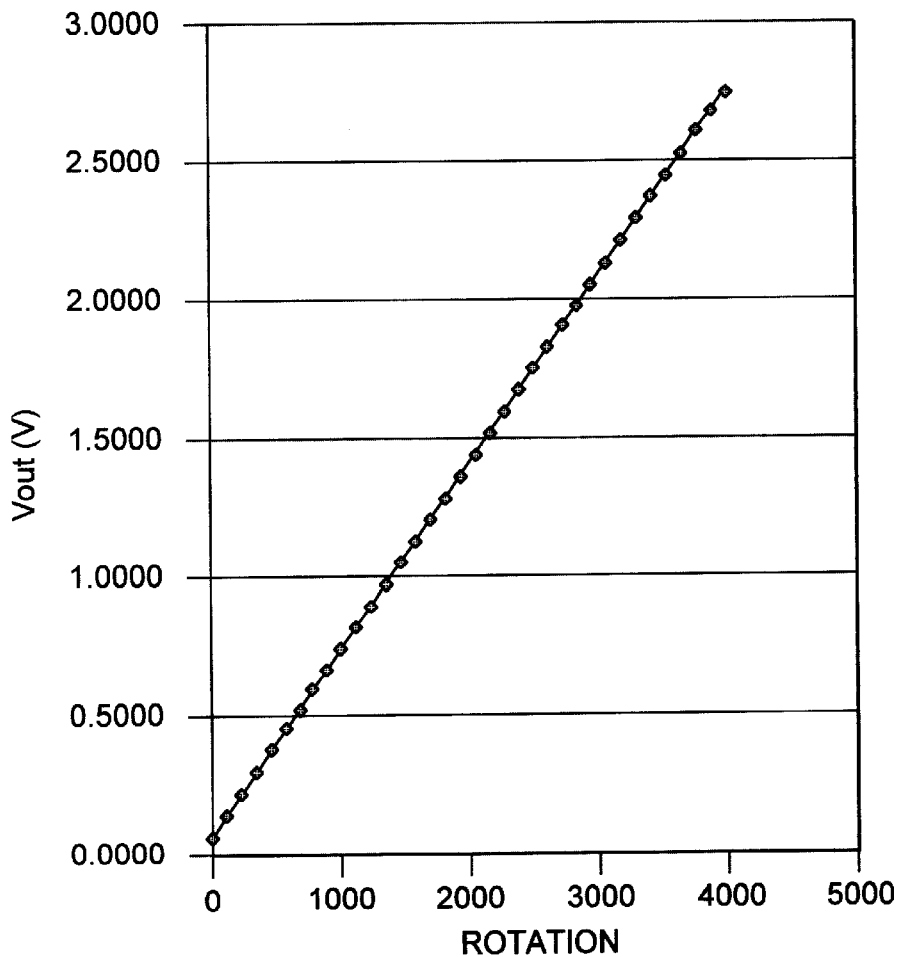
FIG. 12
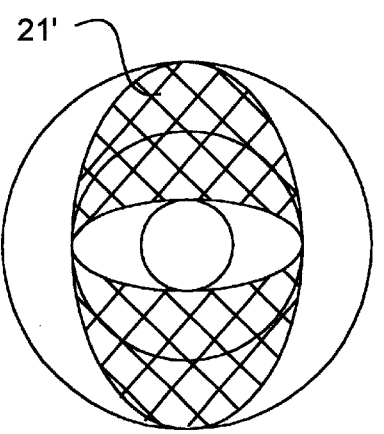 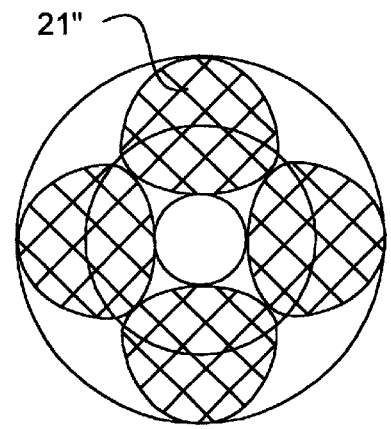
FIG. 13  FIG. 14

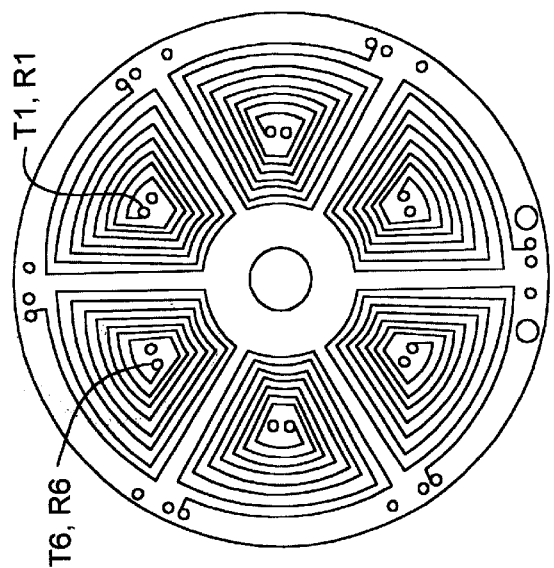
FIG. 15A  LAYER 2
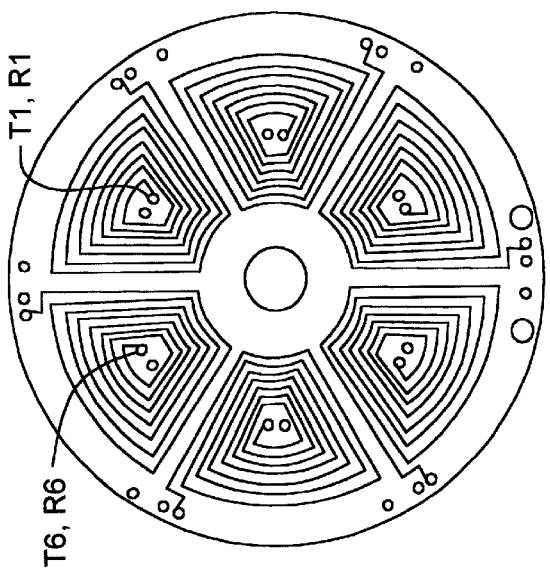
FIG. 15B  LAYER 3
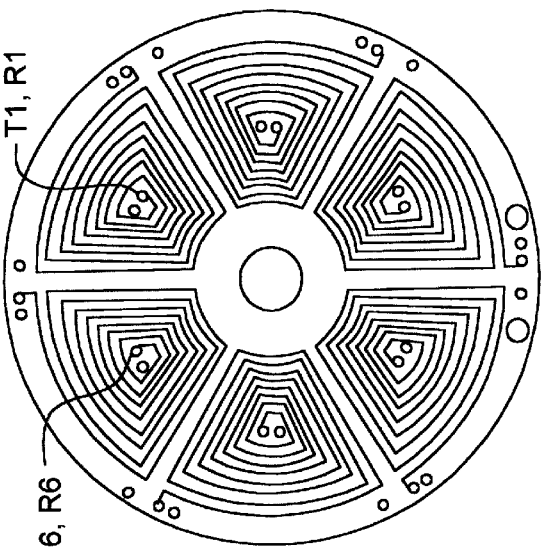
FIG. 15C  LAYER 4
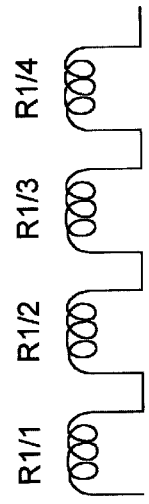
FIG. 16
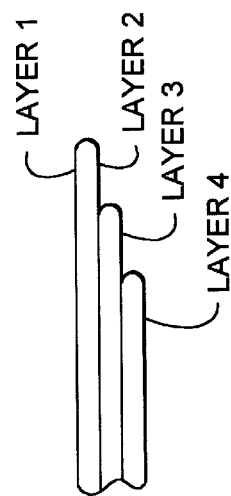
FIG. 17

ANGULAR POSITION SENSOR WITH INDUCTIVE ATTENUATING COUPLER

INTRODUCTION

The present invention is directed to angular position sensor with an inductive attenuating coupler and more specifically to a non-contact type of sensor having inductively coupled transmit and receive disks with an interposed rotatable coupler.

BACKGROUND

In order to meet the current stringent reliability and meantime before failure (MTBF) requirements demanded by the automotive, industrial and aerospace industries, position sensors must be based on a non-contact design approach. This is in order to minimize the wear and tear on internal components. And especially for automotive use, the design must be suited for low cost, high volume, and high reliability. One type of non-contacting sensor utilizing a so called screened inductance is illustrated in U.S. Pat. No. 4,986,124. Here a pair of drive and sense windings on the same printed circuit board have a conductive screen adjacently mounted on an axis or pin, which when rotated can "shade" the sense winding. As summarized by the above patent, it operates as follows: (column 12, line 33) "Transducer output from screened inductance sensor is essentially an amplitude modulated carrier frequency. The carrier component is normally removed in the first stage of signal processing by synchronous modulation. The transfer function relating the input variable [that is rotation ] to signal magnitude is the most important characteristic of any position measuring device."

However, the use of a detected amplitude, especially for automotive and industrial applications is not suitable. Such amplitude is affected by the separation between transmitter and receiver and also the power level of the transmitted signal. Errors resulting from the foregoing uncertainty will not provide acceptable performance.

OBJECT AND SUMMARY OF INVENTION

It is therefore a general object of the present invention to provide an improved angular position sensor. In accordance with the above object there is provided an angular position sensor for sensing rotation about an axis comprising a pair of spaced substantially circular transmit and receive disks juxtaposed on the axis facing each other with a coupler disk between them, the coupler disk being rotatable about the axis. The receive disk carries a predetermined number of independent inductive coils segmentally arranged in a circular pattern around the receive disk. The transmitter disk carries coil means driven by a signal service at a predetermined radio frequency for inductive coupling to the coils of the receive disk. The coupler disk carries a symmetrical conductive pattern for attenuating the inductive coupling, the pattern having rotary angular positions of maximum and minimum attenuation with respect to any one of the plurality of inductive coils carried by the receive disk, intermediate positions of the pattern between maximum and minimum providing a substantially linearly proportionate attenuation. Means are connected to the plurality of coils carried by the receive disk for demodulating and summing induced transmitted signals from the signal source for each angular position of the coupler, the summation producing a substantially sinusoidal waveform whose phase shift varies in proportion to the coupler rotation. Means are provided for the sensing the phase shift.

BRIEF DESCRIPTION OF DRAWINGS

FIG. 1 is a side elevation view of an angular position sensor incorporating the present invention.

FIG. 2 is a plan view of both transmit and receive portions of FIG. 1.

FIG. 3 is a plan view of a coupler disk of FIG. 1.

FIG. 4 is a plan view of FIG. 3 showing greater mathematical details.

FIG. 12 is a graph illustrating the linearity of the present invention.

FIGS. 13 and 14 are plan views of alternate embodiments of FIG. 3.

FIGS. 15A, 15B, and 15C are plan views illustrating the detailed structure of FIG. 2.

FIG. 16 is a side elevation view of FIG. 2 and FIGS. 15A, 15B, and 15C combined.

FIG. 17 is a circuit schematic of FIG. 16.

DESCRIPTION OF PREFERRED EMBODIMENTS

Figure 6:
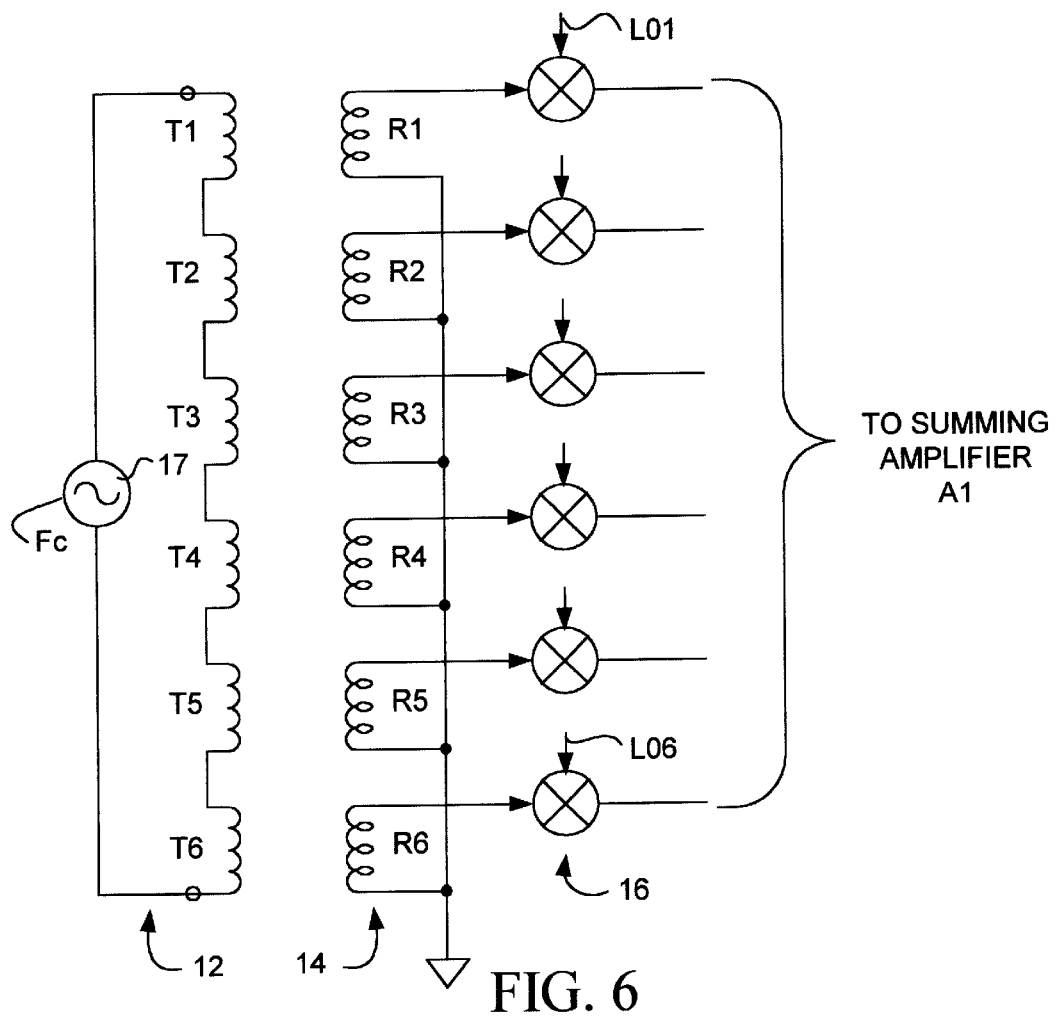
FIG. 6 is a more detailed schematic of a portion of FIG. 5.

Referring now to FIG. 1 the axis 10 includes the shaft 11 on which is mounted for rotation a coupler disk 12 (also see FIG. 3). The disk is made of an insulating material such as plastic and as illustrated in FIG. 1 is interposed between a pair of substantially circular transmit and receive disks 13 and 14. These are fixed with respect to each other. FIG. 2 illustrates both disks 13 and 14 which are substantially identical. The transmit disk consists of six spiral loop antenna patterns designated T1 through T6 which are connected in a series as illustrated in FIG. 6. The receive disk 13 is also illustrated in FIG. 6 and has six identical spiral loop antenna patterns R1 through R6 with the exception that each receive coil is separately connected to a digital mixer circuit 16 a portion of which is shown. The transmit disk 12 is driven by a signal source 17 which has a frequency, $F_c$, of 1 MHz.

Referring back to FIG. 2 both transmit and receive disks 13, 14 carry their predetermined number of independent spiral conductive coils (in this case six) segmentally arranged in a circular pattern around the disk. The pattern completely encircles the disk a full 360°. Thus, each coil, in the form of a spiral loop antenna, has been deformed to provide the required 60 degree segments.

In actual practice to provide for increased inductance, each coil for example, R1, is divided (see FIG. 17) into four portions designated R1/1, R1/2, R1/3, and R1/4. These layers 1–4 are mounted as illustrated in FIG. 16 on the transmit and receive disks 12 and 14 in a sandwich or layered type of construction. Thus, each transmit and receive disk actually has three laminated together subdisks. This substantially increases inductance but may not be absolutely necessary, especially if larger diameter disks are utilized.

Now referring back to the coupler disk of FIG. 3, this includes a crescent-shaped symmetrical conductive pattern 21 which is carried by the insulating disk 12. Other patterns may be suitable as illustrated in FIGS. 13 and 14 as will be discussed below. This conducive coupler pattern when interposed between the transmit and receive disks 13 and 14 as illustrated in FIG. 1 attenuates the inductive coupling between the disks.

Referring now to FIG. 4 such pattern 21 has a single rotary angular position of maximum attenuation where the portion 22 is exactly interposed between a pair of coils of transmit and receive disks 13 and 14. The coil patterns of 13 and 14 of R1–R6 are identical and they are spatially mated to one another. This provides enhanced operation. The crescent shaped pattern 21 also has a single position of minimum attenuation shown at 23. This is of course where a minimum of attenuating conductive layer affects the inductive coupling between the transmit and receive coils.

It is believed that the crescent shaped pattern of FIG. 4 is a ideal to provide for a linear or pulse width modulated output versus angle of rotation. FIG. 12 illustrates an actual curve which shows essential linearity which was achieved with this crescent shaped pattern. The pattern is generated with respect to the axis 10 rotation and the 4 diameters designated $d_1$, $d_2$, $d_3$, and $d_4$. $d_2$, is the diameter of the aperture in the coupler disk 21. This is an inner diameter, and the outer diameter of the disk is $d_1$. The cross-hatched area of the pattern 21 is exactly equal to one-half of the area of the disk between the inner and outer diameters. The pattern is formed by providing a intermediate dashed circle indicated as 24 which is one-halfway between the inner diameter $d_2$, and the outer diameter $d_1$. Then the circle designated with a diameter $d_4$ is drawn which has one side tangent to the circle 24 and the other to the inner diameter $d_2$. Then the crescent shaped object is formed by another circle 26, which has one end of its vertical diameter $d_3$ tangent to the mid-circle 24 and the other end to the outer diameter circle $d_1$. Thus, $d_3=¼.(3d_1+d_2)$ and $d_4=¼.(d_1+3d_2)$.

Again, to re-emphasize, this type of shape provides a substantially linearly proportionate attenuation between the maximum point 22 and the minimum 23 which is also indicated by FIG. 12, which is actually is a measured output using the pattern of FIG. 4.

Figure 5:
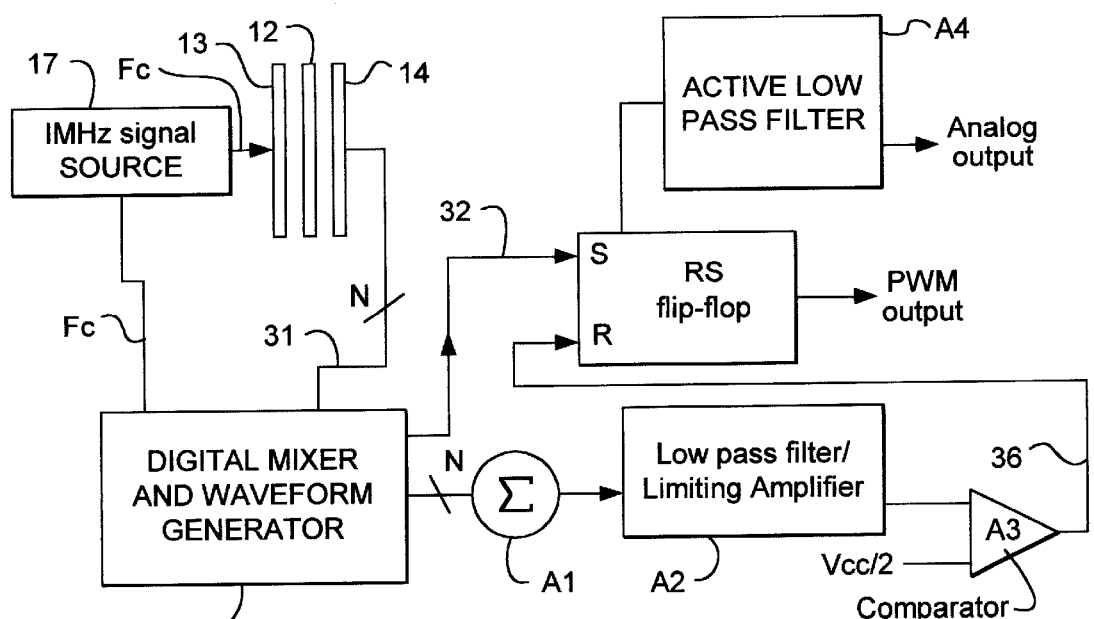
FIG. 5 is a simplified circuit schematic incorporating FIG. 1, illustrating the present invention.

FIG. 5 is a circuit diagram illustrating the oscillator or signal source 17 which supplies a signal, $F_c$, to the coils of transmit disk 13, which are inductively coupled to receive disk 14 and attenuated by the rotary coupler 12. The signal source 17 is also connected to a digital mixer and waveform generator 16 which also has as an input 31, the six receive coils. On output line 32 a set (S) signal is supplied to an RS flip-flop.

Since the coupler disk will interrupt and attenuate the signal amplitudes based on the coupler pattern with respect to the position of each receiver coil, that is R1 through R6, six different amplitude signals are simultaneously generated at any one angular position of the coupler. Six has been chosen as the number of channels since this will result in an improved linearity of greater than 0.5 percent. However, three channels may be suitable in some cases since this will reduce the modulator costs.

The six signals from mixer (demodulator) 16 are summed by an amplifier A1 (see also FIG. 6) and then input to a low pass filter limiting amplifier A2.

The output signal of amplifier A2 is shown in FIGS. 10a, 10b, 10c, and 10d.

These sinusoidal waveforms relate to four difference coupler positions (of course, only one coupler position at a time would be outputted) where phase shift varies in accordance with coupler rotation. The coupler positions indicated in FIGS. 10a–10d represent a zero to 90 degree angular rotation. The amplitude of each receive coil is attenuated according to the rotation and the amplitudes of each coil are illustrated as R1 through R6.

Referring back to FIG. 5, comparator A3 then converts these waveforms to a square wave at output 36 which drives the R input of the RS flip-flop. The RS flip flop output is a pulse width modulated (PWM) output where the width of the pulse is exactly proportionate to the degree of rotation from zero to 360 degrees of the shaft 11 (FIG. 1). An active low pass filter A4 provides for a PWM to analog conversion to provide an analog voltage output as indicated. This is the voltage output that is shown in FIG. 12. The rotation is indicated by a linear digital scale derived from an independent measurement source. From a practical standpoint, the rotation is tracked from zero to 355 degrees with merely 5 degrees of in determinancy.

Figure 11A:
FIGS. 11A–11I are additional waveforms and timing diagrams illustrating the operation of FIG. 5.
Figure 11B:
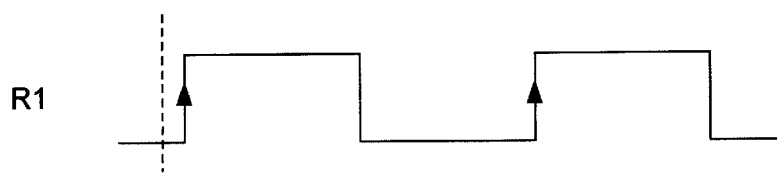
Figure 11C:
Figure 11D:
Figure 11E:
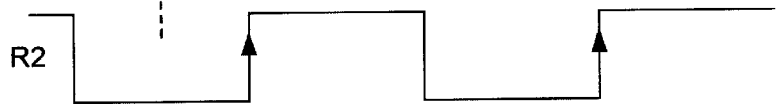
Figure 11F:
Figure 11G:
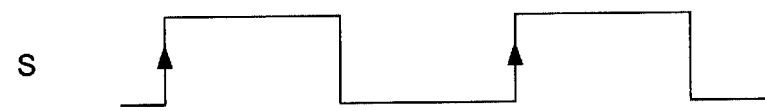
Figure 11H:
Figure 11I:

FIGS. 11A through 11I illustrate the operation of the RS flip-flop and the generation of the pulse width modulated output is illustrated in FIGS. 11C, 11F and 11I. The R1, R2, and R3 inputs are of course for different degrees of rotation. FIG. 11C shows a PWM output for less than 10 degrees of rotation, FIG. 11F an intermediate amount of rotation, and FIG. 11I, the output for up to 355 degrees.

The single tapered pattern illustrated in FIG. 4 provides one cycle of operation per revolution. By providing a linearly tapered trace, the peak to peak linearity error is minimized. If the coupler disk pattern 21 is not symmetrical this results in one peak being greater than the other with reference to a straight line. In other words, errors are produced in the measurement.

As FIGS. 13 and 14 indicate with the cross-hatched portions alternative conductive patterns 21' and 21". In FIG. 13, two tapered patterns are shown which will result in two cycles per revolution; in FIG. 14 four cycles per revolution. Each pattern 21' and 21" has more than one minimum and maximum.

Figure 9:
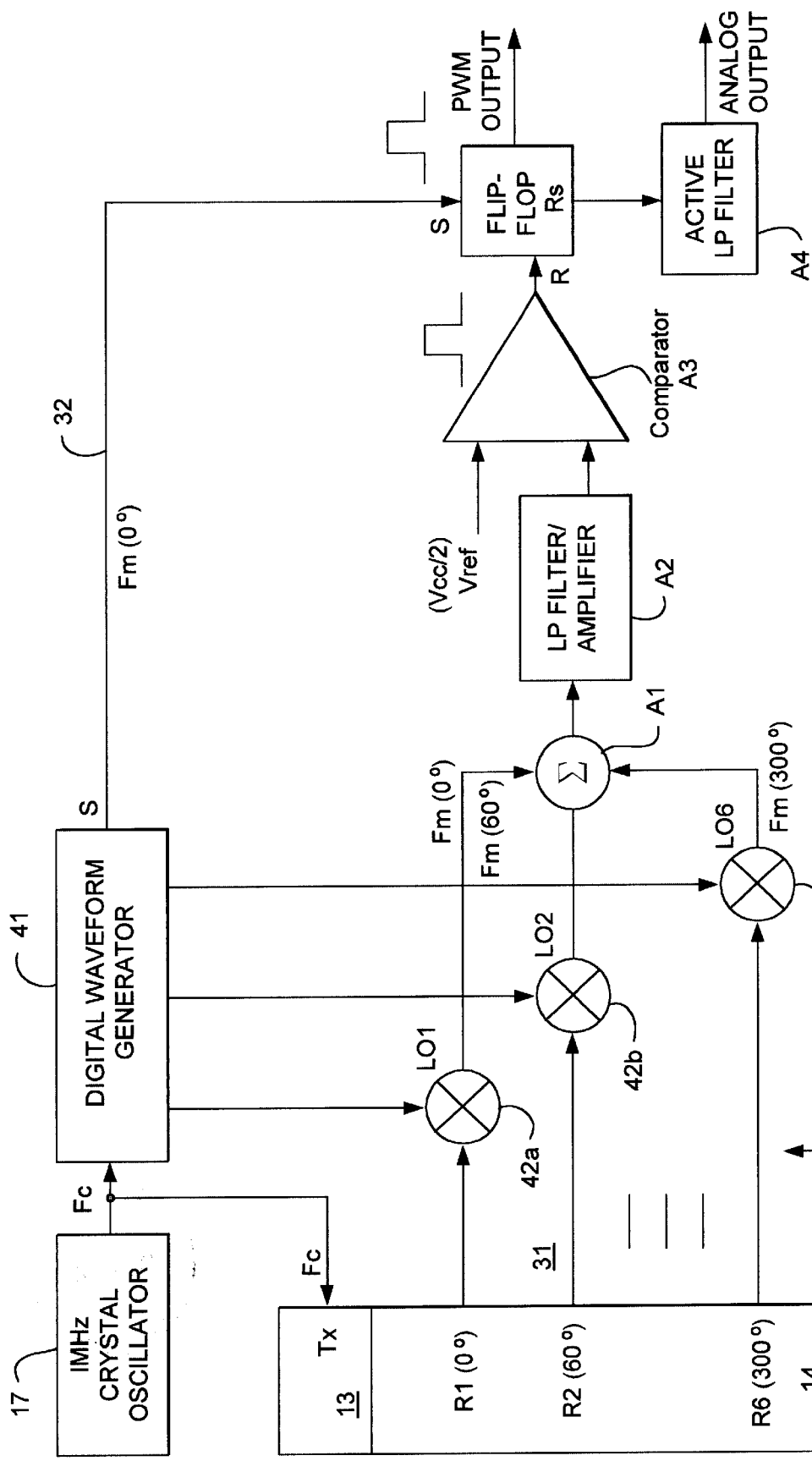
FIG. 9 is a more detailed schematic of a portion of FIG. 5.
Figure 10A:
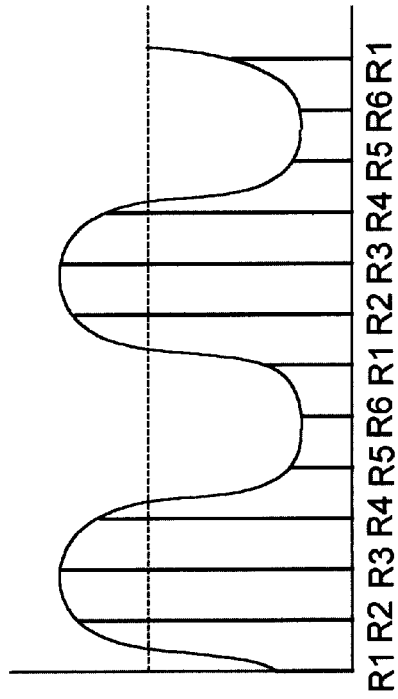
FIGS. 10a, 10b, 10c, and 10d are waveforms illustrating the operation of FIG. 5.
Figure 10B:
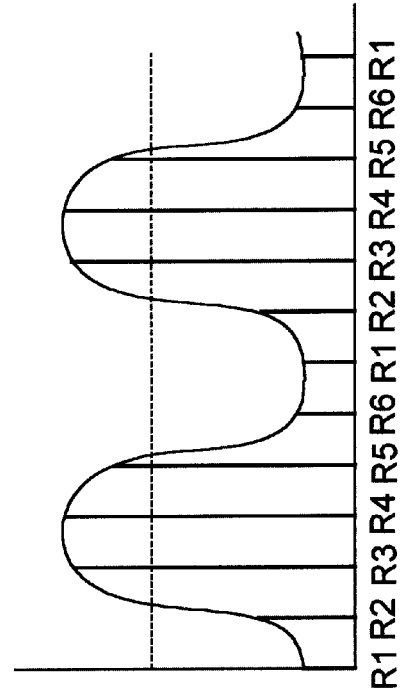
Figure 10C:
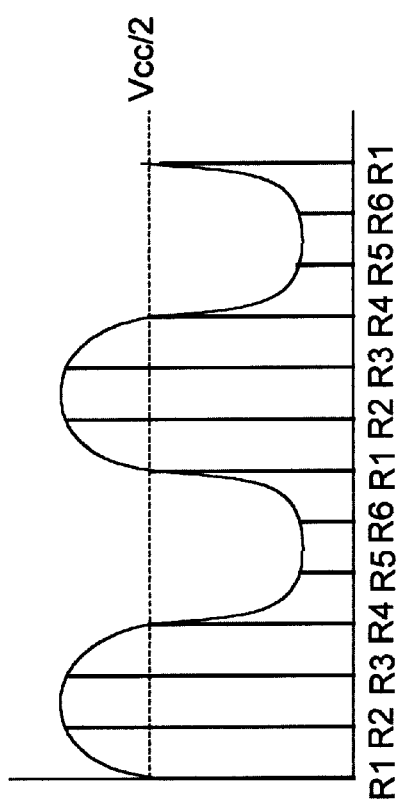
Figure 10D:
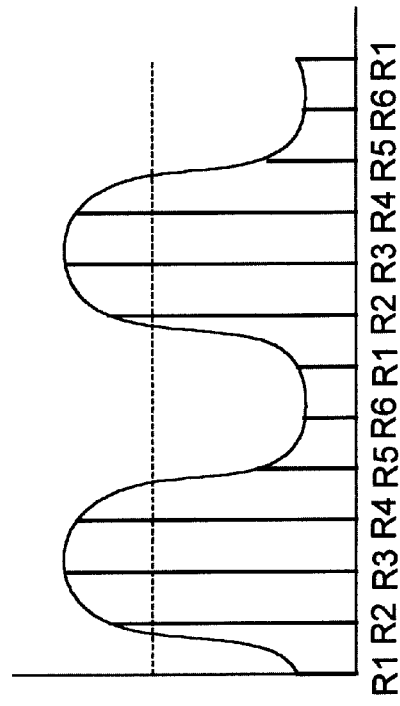

FIG. 9 illustrates FIG. 5 in greater detail where the digital mixer and waveform generator 16 is shown with its functional components. A digital waveform generator 41 is driven by the oscillator 17 and its signal $F_c$. On its six output lines designated LO1–LO6, are six local oscillator signals which are shifted in phase from one another by 60°. In other words, they are shifted by the number N=6, the number of receive coils, divided into 360°. Referring to the FIGS. 10a–10d, this provides the substantially sinusoidal signal whose phase is proportional to rotation. Moreover, the fact that it is a sinusoidal signal implies the linearity as illustrated in FIG. 12. The local oscillator signals drive six mixers designed 42a through 42f, which have as their other inputs the six output lines 31 from receive disk 14. Thus, each one of the six receive coils corresponds to one of the phase shifted local oscillator signals. In other words, the actual physical orientation of the receive coils as illustrated in FIG. 2 (that is 60° from one another) corresponds to the required phase shift of the local oscillator signals. The outputs of the mixers 42a–42f are summed at the summing amplifier A1 and are designated as $F_m(0°)$ and then subsequently with 60° increments.

Figure 7:
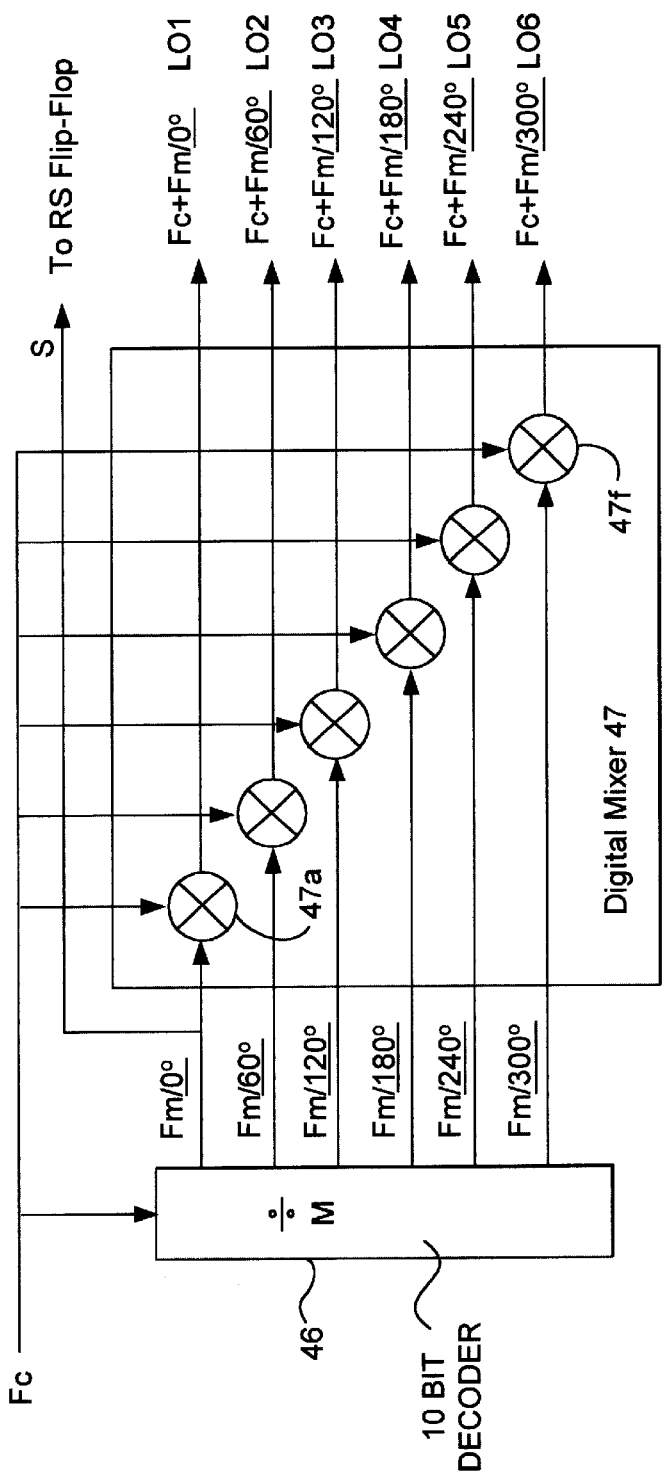
FIG. 7 is a more detailed schematic of a portion of FIG. 5.
Figure 8:
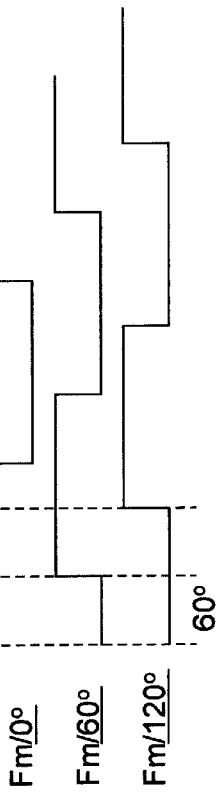
FIG. 8 are waveforms illustrating the operation of FIG. 7.

The foregoing is illustrated in detail in FIGS. 7 and 8 where the digital waveform generator 41 is shown. As illustrated, the local oscillator signals LO1 through LO6 are actually the signal source 17, $F_c$, plus the phase shifted signals $F_m$. These squarewave type signals are illustrated in FIG. 8. In the preferred embodiment, as indicated, $F_m$ is equal to 10 KHz the signals of FIG. 8 are generated by a divide by M unit 46, which is actually 10 bit decoder. And divide by M is substantially 100. Digital mixer 47 includes six individual mixers 47a–47f, which have as one input the $F_c$, signal source and the other the output of the decoder 46 to produce the local oscillator outputs illustrated. Thus, the number of local oscillator signals are equal to the number of receive coils.

Thus, an improved non-contacting angular position sensor has been provided. Linearity of less than one percent is easily achieved without any fine tuning. The sensor device is relatively forgiving with reference to the alignment of the three different disks. Moreover, since the technique is based on a transceiver concept, electromagnetic interference and susceptibility effects are minimized.

What is claimed is:

1. An angular position sensor for sensing rotation about an axis comprising:

a pair of spaced substantially circular transmit and receive disks juxtaposed on said axis facing each other with a coupler disk between them, said coupler disk being rotatable about said axis, said receive disk carrying a predetermined number of independent inductive coils segmentally arranged in a circular pattern around said receive disk, said transmit disk carrying coil means driven by a signal source at a predetermined radio frequency for inductive coupling to said coils of said receive disk;

said coupler disk carrying a symmetrical conductive pattern for attenuating said inductive coupling, said pattern having rotary angular positions of maximum and minimum attenuation with respect to any one of said plurality of inductive coils carried by said receive disk, intermediate positions of said pattern between said maximum and minimum providing substantially linearly proportionate attenuations;

means connected to said coils carried by said receive disk for demodulating and summing induced transmitted signals from said signal source for each angular position of said coupler, said summation producing a substantially sinusoidal waveform whose phase shift varies in proportion to said coupler rotation;

and means for sensing said phase shift.

2. An angular position sensor as in claim 1 where said means for sensing said phase shift includes pulse width modulation means.

3. An angular position sensor as in claim 2 where said pulse width modulation means includes an RS type flip-flop.

4. An angular position sensor as in claim 1 where said coil means of said transmit disk are substantially similar to said inductive coils of said receive disk and equal in number and where respective coils are spatially mated to one another.

5. An angular position sensor as in claim 1 where said symmetrical conductive pattern carried by said coupler disk has one minimum and one maximum and is crescent shaped.

6. An angular position sensor as in claim 5 where said coupler disk has an inner and outer diameter and the area of said conductive pattern is equal to one-half of the area of the disk between said inner and said outer diameters.

7. An angular position sensor as in claim 1 where each of said coils includes a plurality of layers to increase inductance.

8. An angular position sensor as in claim 1 where the number of said coils carried by said receive disk is 6 or more.

9. An angular position sensor as in claim 1 where said means for demodulating generates a plurality of local oscillator signals equal to said number of receive coils.

10. An angular position sensor as in claim 9 wherein each of said local oscillator signals is shifted in phase from one another by 360° divided by said number of receive coils.

* * * * *